G. W. RHINES.
Nut-Lock.
No. 215,836.  Patented May 27, 1879.
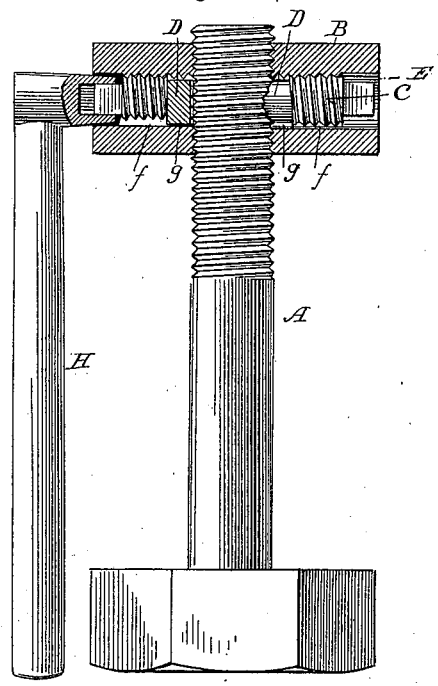
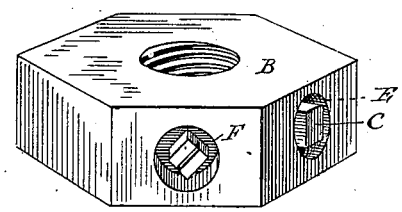
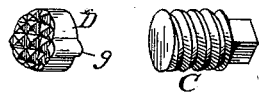
Attest:
Clarence Poole
J. M. Gebhardt
Inventor:
George W. Rhines
By E. R. McKean
Atty

UNITED STATES PATENT OFFICE.

GEORGE W. RHINES, OF RIDGWAY, PENNSYLVANIA.

IMPROVEMENT IN NUT-LOCKS.

Specification forming part of Letters Patent No. 215,836, dated May 27, 1879; application filed March 5, 1879.

*To all whom it may concern:*

Be it known that I, GEORGE W. RHINES, of Ridgway, in the county of Elk and State of Pennsylvania, have invented certain new and useful Improvements in Lock Nuts or Burrs; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to lock burrs or nuts and the mode of securing and keeping the same in position.

Figure 1 is a sectional view of nut, showing manner of securing same; Fig. 2, a perspective view. Fig. 3 shows the lock screw and die.

A is the bolt or rod. B is the nut. C is the lock-screw, and D the die-plate face for the same.

It is well known that where bolts and nuts are used the nuts become loose by jar and motion, thereby affecting their proper use, and by the loss of the nut ofttimes causing very serious damage, and to prevent which many devices have been invented and used with more or less success.

By my plan I take the ordinary nut or any nut, and bore one or more holes, E E, in it, from its side to the center hole of the nut, as shown by Figs. 1 and 2. These holes have small slots $f\ f$ on one side, in which the projection or lip $g$ on the die-plate D moves and prevents the same from turning. This plate D is made of hardened steel similar to a portion of a die for cutting screws, and has cut upon its face the same thread as the male screw on the bolt.

A small lock-screw, C, with a square head, fits and works in the holes E E, above the die D, and which, by being turned down by the socket-wrench H, as shown in Fig. 1, presses the die into the material of the bolt A without injuring the thread of the same.

It will be readily seen that by this plan I fasten the nut or burr firmly in any position, and the nut is thereby prevented from moving by any amount of jar or friction, and for all kinds of machinery, bridge straining-rods, or other places where nuts are likely to be loosened or lost will be found to remedy all defects and fully answer the purpose intended. A slight turn of the lock-screw releases the pressure upon the bolt and allows the nut to turn freely.

It will also be seen that by my device the lock-screw does not project beyond the face of the nut, and is not, therefore, liable to be displaced or loosened, except by use of the wrench.

If desirable, a slot can be cut in the head of the lock-screw, so that a screw-driver may be used instead of the wrench when the same cannot be readily worked.

Perhaps one lock-screw would be sufficient in ordinary cases to completely secure the nut; yet, as parts of the machinery and the position of the nut might make it impossible to reach the screw, I therefore prefer to have more than one to guard against any contingency.

Having described my invention, what I claim, and desire to obtain by Letters Patent, is—

1. As my improvement in lock-nuts, the die-plate D, concave on one surface corresponding to the shape of the bolt, and presenting on said surface a number of pyramidal spurs that interlock with the threads of the bolt, as described and shown.

2. Jointly with the nut having a screw-threaded hole in its side perpendicular to the bolt-hole, the screw C, with a squared head, lying entirely within the body of the nut, and the concave spurred die-plate D, as described and shown.

3. A lock-nut having two or more side holes perpendicular to the bolt-hole, two or more screws, C, and two or more die-plates, D, the parts severally being substantially as described and shown.

GEORGE W. $\overset{\text{his}}{\times}$ RHINES.
<div style="text-align:right">mark.</div>

Witnesses:
 GEO. A. RATHBUN,
 S. A. ROTE.